Patented Oct. 10, 1933

1,929,875

UNITED STATES PATENT OFFICE

1,929,875

DYESTUFFS AND INTERMEDIATES OF THE ANTHRAQUINONE SERIES

William Smith, Sidney Thornley, and Robert Fraser Thomson, Grangemouth, Scotland, assignors to Imperial Chemical Industries Limited, a corporation of Great Britain No Drawing. Application October 20, 1931, Serial No. 570,036, and in Great Britain October 21, 1930

7 Claims. (Cl. 260—60)

This invention relates to the production and use of dyes and intermediates of the anthraquinone series, and in particular of dyes derived from 1:4-diphthalimidoanthraquinone.

In British Specification No. 231,206 a general process is described and claimed for the nitration, hydrolysis and reduction of diphthalimidoanthraquinones, but 1:4-diphthalimidoanthraquinone is not specifically mentioned as a starting material. In British Specification No. 2702/09 the production of vat dyes by aroylation of aminoanthraquinones is described, and benzoylated 1:4:5-triaminoanthraquinone is mentioned as dissolving in sulphuric acid to a yellow solution and giving Bordeaux-red dyeings on cotton from a dull red hydrosulphite vat.

According to the present invention we select for aroylation an aminoanthraquinone prepared from 1:4-diphthalimidoanthraquinone by nitration, hydrolysis and reduction, and thereby obtain dyes having notable advantage over known dyes of this class. The benzoylated product obtained according to our invention dissolves in sulphuric acid with a brownish green colour and dyes cotton from a deep red hydrosulphite vat in olive-green shades becoming bright red on oxidation. The shade is quite different from the Bordeaux-red above mentioned, and fills a useful gap in the range of vat dye shades. Moreover the combined light, washing, soda-boiling, and chlorine fastness of the new dye exceeds that of any red vat dye known on the market.

The process of our invention comprises nitration of 1:4-diphthalimidoanthraquinone (obtainable from 1:4-diamino-anthraquinone and phthalic anhydride, or from 1:4-dihalogeno-anthraquinones and phthalimide, and purified if desired by crystallization from nitrobenzene) preferably in a sulphuric acid medium and preferably with nitric acid substantially in excess of that required for mononitration. The N-phthalimido-groups are then removed by hydrolysis, e. g. with sulphuric acid, and the hydrolyzed product is reduced, e. g. with sodium sulphide. The reduction product is finally treated with benzoyl chloride or other aroylating agent.

During nitration a nitro group enters, probably in position 5, and the product after hydrolysis and reduction is according to our present information 1:4:5-triaminoanthraquinone. Benzoylation of the triaminoanthraquinone obtained in this way leads, however, to a tribenzoyl derivative which differs from the supposed tribenzoylated 1:4:5-triaminoanthraquinone described in British Specification No. 2702/09. The differences shown in the following table prove that the products are different compounds:

| | Product of British Specification No. 2702/09 | Our tribenzoyl-1:4:5-triamino-anthraquinone |
|---|---|---|
| Colour | | Red. |
| Solution in H₂SO₄ cold | Yellow | Brownish green. |
| Solution in H₂SO₄ hot | Yellow | Bluish green. |
| Solution in H₂SO₄ heated, cooled, and treated with formaldehyde | | Bright blue. |
| Hydrosulphite vat | Dull red | Deep red. |
| Dyeing on cotton from hydrosulphite vat | | Olive green. |
| Dyeing after oxidation | Bordeau red | Bright red. |

In the present specification and claims, when we refer to tribenzoyl-1:4:5-triaminoanthraquinone we mean the product having the properties given in the last column of the above table.

The invention is illustrated but not limited by the following examples, in which the parts are by weight.

Example 1

This describes the nitration of 1.4-diphthalimidoanthraquinone.

70 parts of concentrated sulphuric acid and 24 parts of 23% oleum are mixed with stirring. After cooling to 20° C. 16 parts of 94% nitric acid are gradually added maintaining the temperature below 30° C. The temperature of the reaction mixture is now regulated to 10° C. 12 parts of 1.4-diphthalimidoanthraquinone are gradually and uniformly added during 75 minutes, maintaining the temperature at 10° C. The whole is stirred for a further 3¼ hours at 10° C. The mixture is now drowned in 1400 parts of water, stirred, filtered, washed completely acid free with cold water and dried at 95-100° C. A quantity of concentrated sulphuric acid equal in weight to ten times the weight of the product to be hydrolyzed is stirred and heated to 70° C. At 70° C. the nitration product is added as quickly as convenient. The temperature of the whole is now raised to 90° C. and maintained at 90° C. for three hours. The product is cooled and poured into a quantity of stirred cold water equal to fourteen times the weight of concentrated sulphuric acid used. The whole is filtered and washed acid free with cold water. The product is left as a paste and immediately reduced. The resulting nitro-diamino-anthraquinone is reduced as follows:—

The paste resulting from the hydrolysis is stirred into 300 parts of water and caustic soda solution added until a faintly alkaline reaction can be obtained. A solution of 20 parts of sodium sulphide and 1.5 parts of caustic soda in 200 parts of water is then run into the paste. The temperature is raised to 50° C. in 2 hours, then to 95° C. in another 30 minutes, and kept at 93–100° C. for 1½ hours. The mixture is then cooled to 25° C., filtered, washed alkali free with cold water, and dried at 95–100° C.

Other alkali metal sulphides, e. g. potassium sulphide, may equally well be used and other caustic alkalies may replace the caustic soda.

Example 2

The product obtained as in Example 1 is benzoylated as follows:

67 parts of dry nitrobenzene are heated with stirring to 90° C. 12 parts of the reduction product are added and the temperature raised to 150° C. At 150° C. 23.3 parts of pure benzoyl chloride are gradually added. This addition must not be made too quickly, or the mixture will froth. The temperature is now raised to 170° C. as quickly as possible and kept at this temperature for 30 minutes. The mixture is allowed to cool to room temperature, 134 parts of cold dry nitrobenzene added and the whole allowed to stir for 30–60 minutes. It is filtered and the residue washed with cold dry nitrobenzene until the washings have a transparent red colour.

The residue can, if desired, be extracted with 100 parts of dry nitrobenzene by boiling for 5 minutes with good stirring allowed to cool with stirring to room temperature, filtering and washing with cold dry nitrobenzene until the washings possess a transparent red colour. The product is steam distilled to remove nitrobenzene.

Finally the product can be bleached either in acid or alkaline suspension. It dyes cotton from a deep dark red alkaline hydrosulphite vat in olive green shades, turning to bright red on oxidizing.

Example 3

This is a further example of the nitration, hydrolysis and reduction.

70 parts of 96% sulphuric acid and 24 parts of 23% oleum are mixed, keeping the temperature below 30° C. 16 parts of 96% nitric acid are gradually added to the stirred mixture again keeping the temperature below 30° C. The temperature of the nitrating mixture is lowered to 5° C. At this temperature 12 parts of the 1:4-diphthalimidoanthraquinone (obtained by oxidation of leuco-1:4-diaminoanthraquinone by air in nitrobenzene at 140° C. and condensing with phthalic anhydride without isolation of the 1:4-diamine) are gradually added during 1½ hours. The temperature of the stirred mixture is afterwards kept at 5° C. for a further 4 hours. The mixture is now poured into 2500 parts of water with good stirring, filtered and the residue washed with cold water until it is completely free from acid. The solid is dried at 95–100° C. Sulphuric acid (96%) equivalent in weight to ten times the quantity of solid to be hydrolyzed is heated to 70° C. At this temperature the product obtained as just described is added as quickly as convenient. The temperature of the whole is now raised to 90° C. and maintained at 90° C. for 3½ hours. The product is cooled and poured into a quantity of stirred cold water equal to ten times the weight of sulphuric acid used. The whole is filtered and washed acid free with cold water.

The paste so obtained is stirred with 350 parts of water for thirty minutes, during which sufficient 20% caustic soda solution is added to destroy any acidity in the paste.

20 parts of sodium sulphide and 1.5 parts of caustic soda are dissolved in 150 parts of water and added to the above mixture. The temperature is raised to 80° C. during two hours. Then it is raised to 95° C. in 30 minutes and maintained at 95–100° C. for 1½ hours. The reaction mixture is cooled to 25° C. and, after allowing to stand overnight, it is filtered. The residue is washed free from alkali with cold water and dried at 95–100° C.

Example 4

This describes the treatment of the product of Example 3 with benzoyl chloride.

67 parts of nitrobenzene are heated to 80–100° C. 12 parts of the product of Example 3 are added and the mixture heated to 150° C. 23.3 parts of benzoyl chloride are now slowly added keeping the temperature at 150° C.

The internal temperature is now raised as quickly as possible to 175° C. and maintained at 175° C. for 30 minutes. The mixture is cooled to room temperature with stirring, 134 parts of cold dry nitrobenzene added and the whole allowed to stir overnight. The product is filtered and the residue washed with cold dry nitrobenzene until the washings have a transparent red colour. The residue can, if desired, be extracted with 100 parts of dry nitrobenzene by boiling for 5 minutes with good stirring and afterwards allowing to cool with stirring to room temperature. The product is filtered and washed with cold dry nitrobenzene until the washings possess a transparent red colour. The product is steam distilled to remove nitrobenzene. It dyes cotton from a deep dark red alkaline hydrosulphite vat in olive green shades turning to bright red on oxidizing.

Example 5

This is an example in which the quantity of nitric acid employed for nitration is reduced.

140 parts of 96% sulphuric acid and 48 parts of 23% oleum are mixed keeping the temperature below 30° C. 8 parts of 96% nitric acid are gradually added to the stirred mixture again keeping the temperature below 30° C. The temperature of the nitrating mixture is lowered to 5° C. At this temperature 24 parts of 1:4-diphthalimidoanthraquinone purified by crystallization from nitrobenzene, are gradually added during 1½ hours. The temperature of the stirred mixture is afterwards kept at 5° C. for a further 4 hours. It is now poured into 2500 parts of water with good stirring, filtered and the residue washed with cold water until it is completely free from acid. The solid is dried at 95–100° C. Sulphuric acid (96%) equivalent in weight to ten times the quantity of solid to be hydrolyzed is heated to 70° C. At this temperature the nitration product is added as quickly as convenient. The temperature of the whole is now raised to 90° C. and maintained at 90° C. for 3½ hours. The product is cooled and poured into a quantity of stirred cold water equal to ten times the weight of sulphuric acid used. The whole is filtered and washed acid free with cold water.

The paste is stirred with 700 parts of water for 30 minutes, during which sufficient 20% caustic soda solution is added to destroy any acidity in the paste.

40 parts of sodium sulphide and 3 parts of caustic soda are dissolved in 300 parts of water and added to the above mixture. The temperature is raised to 50° C. during two hours. Then it is raised to 95° C. in 30 minutes, and maintained at 95–100° C. for 1½ hours. The reaction mixture is cooled to 25° C., and after allowing to stand overnight, it is filtered. The residue is washed free from alkali with cold water and dried at 95–100° C.

*Example 6*

This describes the treatment of the product of Example 5 with a benzoylating agent.

134 parts of nitrobenzene are heated to 80–100° C. 24 parts of the product of Example 5 are added and the mixture heated to 150° C. 46.6 parts of benzoyl chloride are now slowly added keeping the temperature at 150° C. The internal temperature is now raised as quickly as possible to 175° C. and maintained at 175° C. for 30 minutes. The mixture is cooled to room temperature with stirring, 268 parts of cold dry nitrobenzene added and the whole allowed to stir over-night. The product is filtered and the residue washed with cold dry nitrobenzene until the washings have a transparent red colour.

The residue can, if desired, be extracted with 200 parts of dry nitrobenzene by boiling for 5 minutes with good stirring and afterwards allowing to cool with stirring to room temperature. The product is filtered and washed with cold dry nitrobenzene until the washings possess a transparent red colour. The product is steam distilled to remove nitro-benzene. It dyes cotton from a deep dark red alkaline hydrosulphite vat in olive green shades turning to bright red on oxidizing.

We claim:

1. In the manufacture of improved aroylated triaminoanthraquinone dyes from diphthalimidoanthraquinone, the step which comprises mononitrating 1:4-diphthalimidoanthraquinone.

2. The improved process of claim 1 wherein the mononitration is effected in a sulphuric acid medium with nitric acid in excess of that theoretically required.

3. The improved process of claim 1 wherein the nitro compound is further processed; the N-phthaloyl groups being removed by hydrolysis and the nitro group being reduced to an amino group.

4. In the manufacture of improved aroylated triaminoanthraquinones the steps which comprise mononitrating of 1:4-diphthalimidoanthraquinone in a sulphuric acid medium with nitric acid in excess of that theoretically required, removing the N-phthaloyl groups by hydrolysis with sulphuric acid and reducing the nitro group to an amino group by means of aqueous alkali-metal sulphide.

5. An improved process for the manufacture of improved aroylated triaminoanthraquinone dyes from diphthalimidoanthraquinones which comprises mononitrating 1:4-diphthalimidoanthraquinone, removing the N-phthaloyl groups by hydrolysis, reducing the nitro-group to an amino-group, and reacting the product with an aroylating agent.

6. The improved process of claim 5 wherein the aroylated agent is benzoyl chloride.

7. As an improved dyestuff capable of dyeing cotton in bright red shades, the dyestuff obtainable by the process of claim 5, said improved dyestuff having a red color, dissolving in cold sulphuric acid to give a brownish green solution which when heated turns bluish green and which when cooled and treated with formaldehyde changes to a bright blue, the said dyestuff yielding a deep red hydrosulphite vat from which cotton is dyed in olive green shades which upon oxidation become bright red.

WILLIAM SMITH.
SIDNEY THORNLEY.
ROBERT FRASER THOMSON.